United States Patent
Atkin

(10) Patent No.: US 8,893,163 B2
(45) Date of Patent: Nov. 18, 2014

(54) METHOD AND SYSTEM FOR VIEWING MOVIES

(71) Applicant: Cihan Atkin, Gaithersburg, MD (US)

(72) Inventor: Cihan Atkin, Gaithersburg, MD (US)

(*) Notice: Subject to any disclaimer, the term of this patent is extended or adjusted under 35 U.S.C. 154(b) by 10 days.

(21) Appl. No.: 13/893,525

(22) Filed: May 14, 2013

(65) Prior Publication Data

US 2014/0165083 A1 Jun. 12, 2014

Related U.S. Application Data

(60) Provisional application No. 61/646,428, filed on May 14, 2012.

(51) Int. Cl.
| | |
|---|---|
| *H04N 7/16* | (2011.01) |
| *H04H 60/33* | (2008.01) |
| *H04H 60/56* | (2008.01) |
| *H04N 21/442* | (2011.01) |
| *G06Q 30/02* | (2012.01) |
| *G06Q 20/12* | (2012.01) |
| *H04N 21/2543* | (2011.01) |

(52) U.S. Cl.
CPC ......... *H04N 21/44218* (2013.01); *G06Q 30/02* (2013.01); *G06Q 20/123* (2013.01); *H04N 21/2543* (2013.01)
USPC .................................... 725/5; 725/10; 725/12

(58) Field of Classification Search
CPC .................. H04N 21/44218; H04N 21/44222; H04N 21/2543; H04N 21/4185; H04N 21/47211
USPC ...................................... 725/1, 8, 9, 10, 12, 5
See application file for complete search history.

(56) References Cited

U.S. PATENT DOCUMENTS

| | | | |
|---|---|---|---|
| 4,769,697 A | 9/1988 | Gilley et al. | |
| 4,849,737 A | 7/1989 | Kirihata et al. | |
| 4,907,079 A | 3/1990 | Turner et al. | |
| 5,221,919 A | 6/1993 | Hermans | |
| 5,594,794 A * | 1/1997 | Eyer et al. | 380/231 |
| 5,771,307 A | 6/1998 | Lu et al. | |
| 5,793,409 A | 8/1998 | Tetsumura | |

(Continued)

FOREIGN PATENT DOCUMENTS

WO 2008/127235 A2 10/2008

OTHER PUBLICATIONS

International Search Report and the Written Opinion, PCT/US2013/040860, Dec. 4, 2013, 10 pages.

*Primary Examiner* — Hai V Tran
(74) *Attorney, Agent, or Firm* — Edell, Shapiro & Finnan, LLC

(57) ABSTRACT

Techniques are presented herein for delivering multimedia content to members of an audience. At a content delivery device, an activation event is detected that causes the content delivery device to operate in a first mode to detect a presence of one or more of members of an audience in a viewing area. A number of members of the audience in the viewing area is determined. The content delivery device switches to a second mode to initiate a payment request event. The payment request event requests payment for the multimedia content based on the number of members of the audience. A determination is made as to whether an appropriate payment has been received based on the number of members of the audience. When the appropriate payment has been received, the content delivery device switches to a third mode to deliver the multimedia content to the members of the audience in the viewing area.

15 Claims, 8 Drawing Sheets

(56) References Cited

U.S. PATENT DOCUMENTS

| | | |
|---|---|---|
| 7,134,130 B1 | 11/2006 | Thomas |
| 7,460,859 B2 | 12/2008 | Light et al. |
| 7,466,844 B2 | 12/2008 | Ramaswamy et al. |
| 7,609,853 B2 | 10/2009 | Ramaswamy et al. |
| 7,721,305 B2 | 5/2010 | Anderson |
| 8,032,914 B2 | 10/2011 | Rodriguez |
| 8,065,703 B2 | 11/2011 | Wilson et al. |
| 8,125,512 B2 | 2/2012 | Fahn et al. |
| 8,194,923 B2 | 6/2012 | Ramaswamy et al. |
| 8,306,265 B2 | 11/2012 | Fry et al. |
| 8,371,499 B2 | 2/2013 | Manuel-Devadoss |
| 2005/0038749 A1 | 2/2005 | Fitch et al. |
| 2007/0288484 A1* | 12/2007 | Yan et al. ......................... 707/10 |
| 2009/0034793 A1* | 2/2009 | Dong et al. .................... 382/103 |
| 2010/0162285 A1* | 6/2010 | Cohen et al. .................... 725/12 |
| 2011/0063440 A1 | 3/2011 | Neustaedter et al. |
| 2011/0147448 A1* | 6/2011 | Manuel-Devadoss ........ 235/375 |
| 2011/0215932 A1 | 9/2011 | Daniel |
| 2011/0321103 A1 | 12/2011 | Yao |
| 2012/0011555 A1 | 1/2012 | Qian |

* cited by examiner

METHOD AND SYSTEM FOR VIEWING MOVIES

CROSS REFERENCE TO RELATED APPLICATIONS

This application claims priority from U.S. Provisional Application No. 61/646,428 filed on May 14, 2012, the entirety of which is incorporated by reference herein.

TECHNICAL FIELD

The present disclosure relates to delivering multimedia content to members of an audience.

BACKGROUND

Currently, many movie productions are distributed to cinema companies worldwide for broadcast to the general public. Typically, the cinema companies make money by selling tickets for viewing movies at theaters to consumers. For relatively new or first-run movies, consumers must visit movie theaters and purchase tickets in order to view these movies. Consumers can rarely (if at all) watch these movies at home or at locations other than the movie theaters. Thus, a solution is desired that enables in-home distribution of movie productions.

DESCRIPTION OF EXAMPLE EMBODIMENTS

Overview

Techniques are presented herein for delivering multimedia content to members of an audience. At a content delivery device, an activation event is detected that causes the content delivery device to operate in a first mode to detect a presence of one or more of members of an audience in a viewing area. A number of members of the audience in the viewing area is determined. The content delivery device switches to a second mode to initiate a payment request event. The payment request event requests payment for the multimedia content based on the number of members of the audience. A determination is made as to whether an appropriate payment has been received based on the number of members of the audience. When the appropriate payment has been received, the content delivery device switches to a third mode to deliver the multimedia content to the members of the audience in the viewing area.

Example Embodiments

Figure 1:
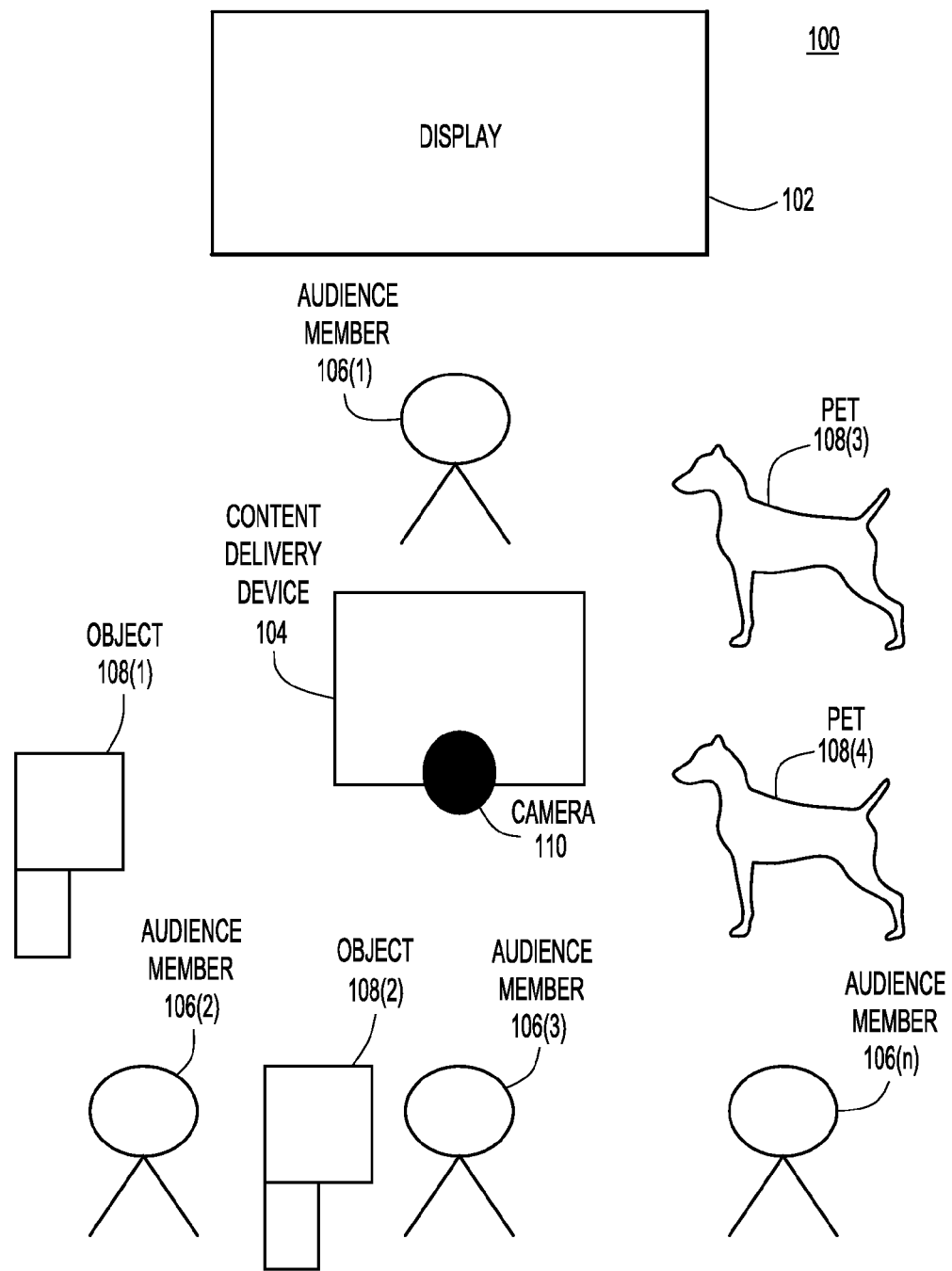
FIG. 1 shows an example environment depicting a display, a plurality of audience members and a content delivery device configured to deliver multimedia content to the audience members.

The techniques described herein relate to a system for delivering multimedia content to members of an audience. Reference is now made to FIG. 1, which shows an example environment 100 for presentation of multimedia content to audience members in a viewing area or broadcast area of the environment 100. It should be appreciated that term "multimedia content" may refer to sensory content that is presented to audience members in the viewing area. For example, the multimedia content may include audio and video content of movies to be delivered to the audience members.

The environment 100 comprises, among other features, a display unit 102 and a content delivery device 104. The environment 100 may also have one or more audience members, shown at reference numerals 106(1)-106(n). It should be appreciated that any number of audience members may be present in the environment 100, and that the representation in FIG. 1 is merely an example. The environment 100 may also have one or more objects, shown at reference numerals 108(1)-108(4). For example, the objects 108(1) and 108(2) may be inanimate objects (e.g., furniture or other objects located in the viewing area) and objects 108(3) and 108(4) may be non-human, animate objects (e.g., pets). As will be described hereinafter, the system of the present disclosure is able to differentiate between the audience members 106(1)-106(n) and the various objects 108(1)-108(4). The system of the present disclosure is also able to differentiate between adult and infant audience members.

The display unit 102 may be any device that is configured to present multimedia content to members of an audience in a viewing range. For example, the display unit 102 may be audio/video equipment currently existing or heretofore contemplated by a person with ordinary skill in the art (e.g., a television, projector, tablet, desktop computer, laptop computer, etc.).

The content delivery device 104 is, for example, a device or system of devices configured to scan, among other things, a viewing area of the environment 100, to detect the presence and number of the audience members 106(1)-106(n) in the viewing area of the environment 100 and, if appropriate, to obtain and deliver multimedia content to the audience members 106(1)-106(n). For example, the content delivery device 104 will obtain and deliver multimedia content to the audience members 106(1)-106(n) upon determination of whether a proper payment for the multimedia content has been made for the multimedia content. These techniques are described in more detail herein.

In one example, the content delivery device 104 comprises, among other features, a sensor 110 that is configured to scan a viewing area of the environment 100 and to detect the number of people in the viewing area. For example, the sensor 110 may be similar to a computer sensor that is configured to scan a room (e.g., a 360° scan of the room relative to the sensor 110 and/or a scan of ceiling-to-ceiling and wall-to-wall scan of the room) to detect the number of people in a room, regardless of their location relative to the sensor 110. For example, in FIG. 1, some of the audience members 106(1)-106(n) may be located behind the content delivery device 104, and these members are still detectable by the sensor 110 of the content delivery device 104.

As stated above and also described herein, the sensor 110 is configured to differentiate between the audience members 106(1)-106(n) and the objects 108(1)-108(4). As will become apparent hereinafter, it is important for the content delivery device 104 to determine the number of audience members 106(1)-106(n) ("participants") that are in a viewing area of the environment 100. For example, the content delivery device 104 determines the number of audience members 106(1)-106(n) in the viewing area 100 and initiates a request for payment of the multimedia content to the audience members 106(1)-106(n) based on the determined number of participants. The content delivery device 104 controls whether or not the multimedia content is delivered to the audience members 106(1)-106(n) by determining whether or not an appropriate payment has been made. For example, if the content delivery device 104 detects four audience members, but payment is received for only three members, the content delivery device 104 will not permit the display device 102 to deliver the multimedia content to the audience members, due to the inadequate or insufficient payment. It should be appreciated that the determination of the number of audience members 106(1)-106(n) in a viewing area may be performed periodically by the content delivery device 104 (e.g., before the start of a movie and periodically as the movie is being displayed to the audience members) to ensure that the multimedia content is not being delivered to a number of audience members greater than that for which payment was received.

The content delivery device 104 may connect automatically (e.g., via a Universal Serial Bus (USB)) to any Smart television (TV) or interactive device such as a PlayStation™, Xbox™, Nintendo Wii™, Videocassette Recorder (VCR), Digital Video Disk (DVD) player or any other electronic equipment that has access to high speed internet. As the content delivery device 104 connects with one or more of these devices, the content delivery device 104 may install proprietary software onto an operating system of the one or more devices to accomplish the techniques described herein.

Thus, in general, the content delivery device 104 has pattern recognition software to identify audience members 106(1)-106(n) in a viewing area and to differentiate the audience members 106(1)-106(n) from the objects 108(1)-108(4). Additionally, the content delivery device 104 is configured to operate in a plurality of modes to detect a number of audience members in a viewing area, to request payment for the multimedia content and to deliver the content to the audience members (e.g., via the display 102) upon proper receipt of payment.

Figure 2A:
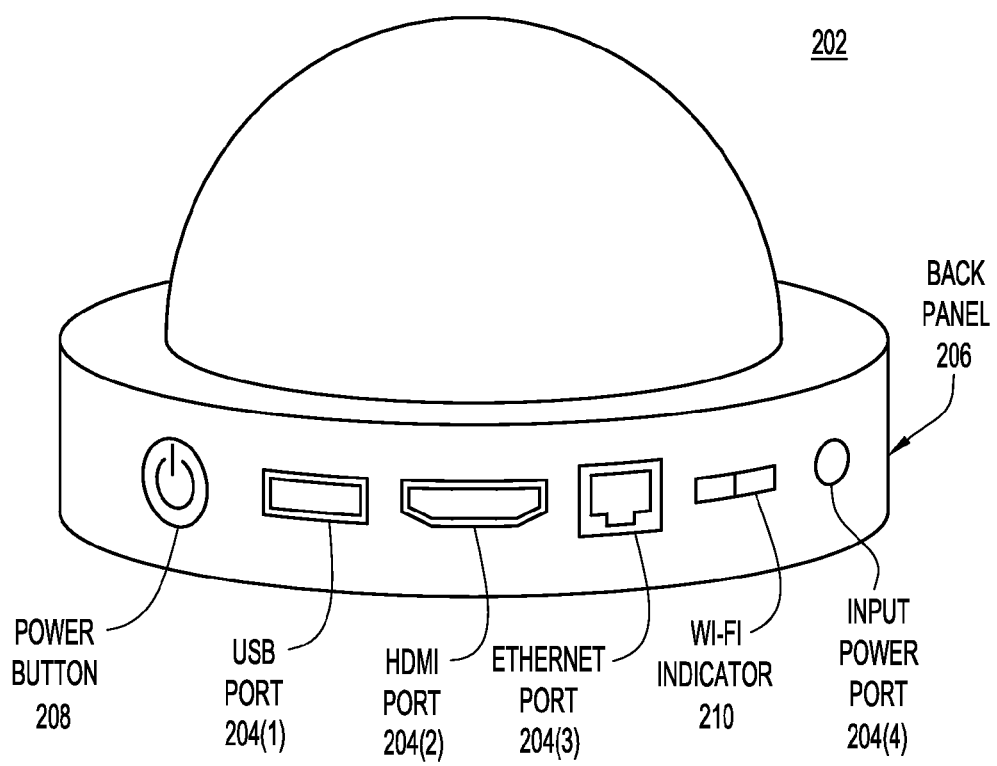
FIGS. 2A-2C shows example views of the content delivery device.
Figure 2B:
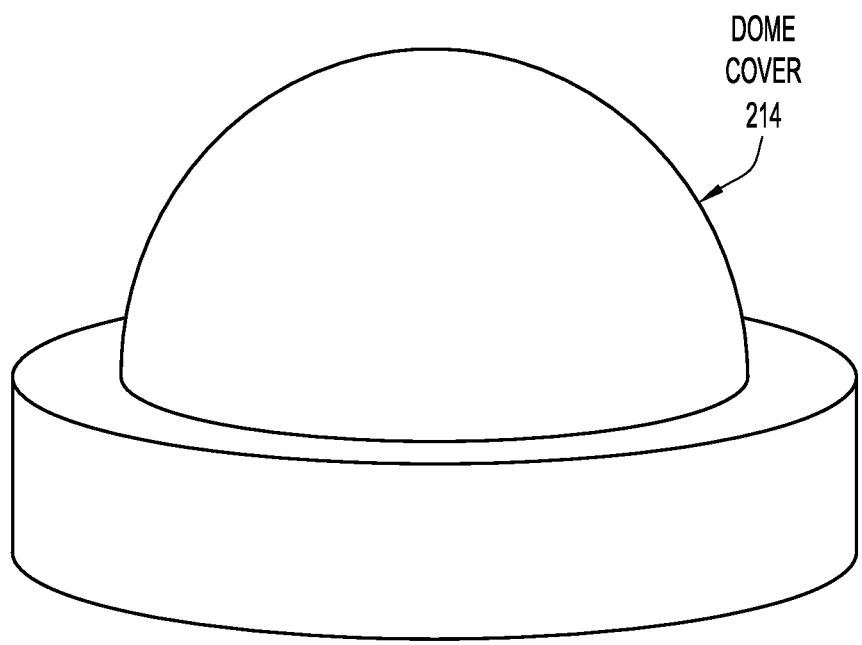
Figure 2C:
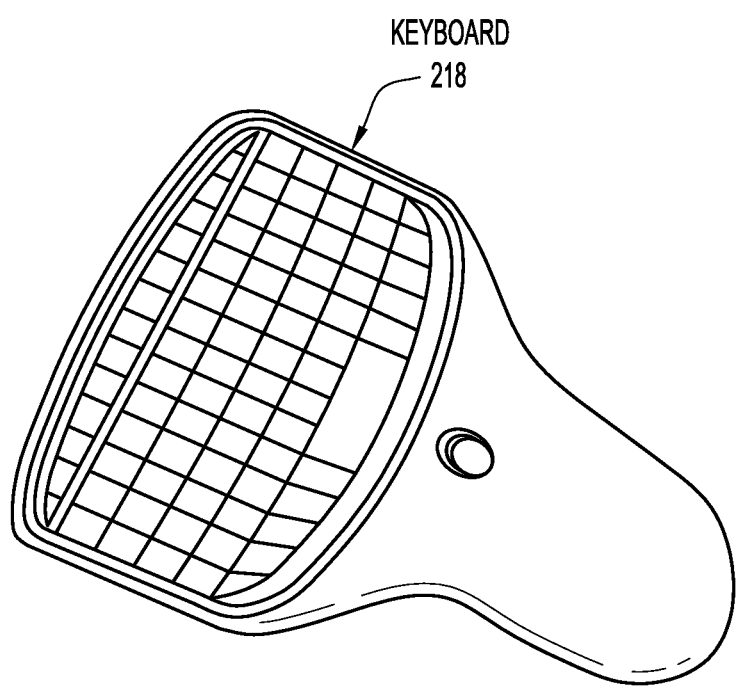

Reference is now made to FIGS. 2A-2C. FIGS. 2A-2C show example components of the content delivery device 104. For example, FIGS. 2A and 2B show respective rear and front views of the content delivery device 104 including the sensor 110, and FIG. 2C shows a top view of a keyboard input unit of the content delivery device 104.

In FIG. 2A, the rear view 202 of the content delivery device 104 is shown with a plurality of ports, depicted at reference numerals 204(1)-204(4). The ports 204(1)-204(4) are located on a back panel 206 of the content delivery device 104. As shown in FIG. 2A, port 204(1) may be a USB port that is configured to interface with a USB cable to enable the content delivery device 104 to connect to one or more devices with access to high speed internet. Port 204(2) may be a High-Definition Multimedia Interface (HDMI) port that is configured to interface with the display unit 102. Port 204(3) may be an Ethernet port that is configured to connect to a Local Area Network (LAN). Port 204(4) may be an input power port to interface with a power cord configured to supply power to the content delivery device 104. The back panel 206 of the content delivery device 104 may also have a power button 208 to power on the content delivery device 104 and a Wi-Fi® indication signal 210 to indicate a wireless connectivity status.

The sensor 110 of the content delivery device 104 is shown in FIG. 2A and also in the front view 212 of the content delivery device 104 in FIG. 2B. The sensor 110 has, for example, a transparent and tinted plastic dome cover 214. A plurality of sensors reside underneath the cover 214. These sensors enable the sensor 110 to have a 360°, or larger, scanning range (e.g., floor to ceiling and wall to wall scanning range) to detect the presence of the audience members 106(1)-106(n) in a viewing area. The sensor 110 may use, for example thermal image recognition, motion detection and pattern recognition software, as described herein. Using various parameters, the sensor 110 can differentiate between the audience members 106(1)-106(n) and the objects 108(1)-108(4) (e.g., between people and inanimate objects/pets). In one example, the sensor 110 may be a Red-Green-Blue (RGB) equipped camera, which is typically used for highly accurate color image acquisition. An RGB camera delivers the three basic color components (red, green and blue) on three different wires. This type of camera often uses three independent charge-coupled devices (CCD) sensors to acquire the three color signals. Other sensors may also be used that are configured to detect humans and to differentiate humans from other objects in a viewing area.

FIG. 2C shows a top view 216 of the keyboard input unit ("keyboard") 218 of the content delivery device 104. The keyboard 218 of the content delivery device 104 is, for example, a full "QWERTY" keyboard that enables a user (e.g., one of the audience members 106(1)-106(n)) to interact with the content delivery device 104. In one example, one or more of the audience members 106(1)-106(n) may use the keyboard 218 to select a movie to watch and may enter an appropriate payment for the selected movie. The amount of payment may be related to the particular movie itself, and the price may be related to the total number of audience members 106(1)-106(n) that are present to watch the movie. As stated above, the content deliver device 104 is configured to periodically detect audience members and to determine the number of audience members 106(1)-106(n) in a viewing area.

Figure 3:
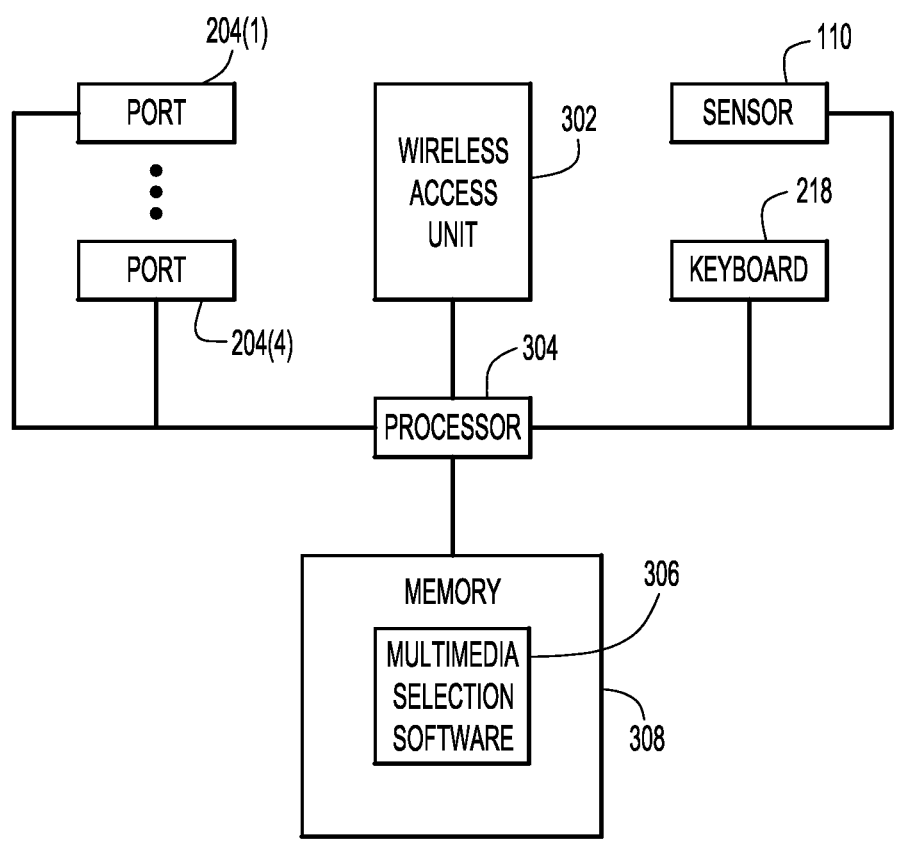
FIG. 3 shows an example block diagram depicting components of the content delivery device.

Reference is now made to FIG. 3. FIG. 3 shows an example block diagram depicting components of the content delivery device 104. As stated above, in connection with FIG. 2A, the content delivery device 104 has a plurality of ports, shown at reference numeral 204(1)-204(4). Additionally, the content delivery device 104 has a sensor 110, a keyboard 218, a wireless access unit 302, a processor 304 and a memory 306. As stated above, the content delivery device 104 is configured to interface with one or more devices with access to high speed internet via the ports 202(1)-202(4). The content delivery device 104 is also able to access high speed internet itself by using the wireless access unit 302 to initiate a Wi-Fi® or other wireless session (e.g., 3G, 4G, etc.) with an Internet Service Provider.

The content delivery device 104 is able to utilize its connection to the one or more devices with access to high speed internet to access a database of multimedia content (e.g., movies) via one or more of these devices and to provide access to the audience members for this multimedia content, if appropriate. For example, a user may input a movie selection via the keyboard 218, and as a result, the content delivery device 104 may access the movie selection from a database of multimedia content via one or more of the devices to which it is connected. Alternatively, the content delivery device 104 may access the multimedia content itself via Internet access obtained via the wireless access unit 302.

The processor 304 of the content delivery device 104 is, for example, a microprocessor or microcontroller that is configured to execute program logic instructions (i.e., software) for carrying out various operations and tasks of the content delivery device 104, as described herein. For example, the processor 304 is configured to execute the multimedia selection software 308 to enable the content delivery device 104 to operate in a plurality of modes to deliver multimedia content to the audience members 106(1)-106(n), if appropriate. The functions of the processor 304 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 306 may comprise read only memory (ROM), random access memory (RAM), magnetic disk storage media devices, optical storage media devices, flash memory devices, electrical, optical, or other physical/tangible (non-transitory) memory storage devices. The memory 306 stores instructions for the multimedia selection software 308. Thus, in general, the memory 306 may comprise one or more computer readable storage media (e.g., a memory storage device) encoded with software comprising computer executable instructions and when the software is executed (e.g., by the processor 304) it is operable to perform the operations described herein.

The multimedia selection software 308 may take any of a variety of forms, so as to be encoded in one or more tangible computer readable memory media or storage device for execution, such as fixed logic or programmable logic (e.g., software/computer instructions executed by a processor), and the processor 304 may be an application specific integrated circuit (ASIC) that comprises fixed digital logic, or a combination thereof.

Figure 4:
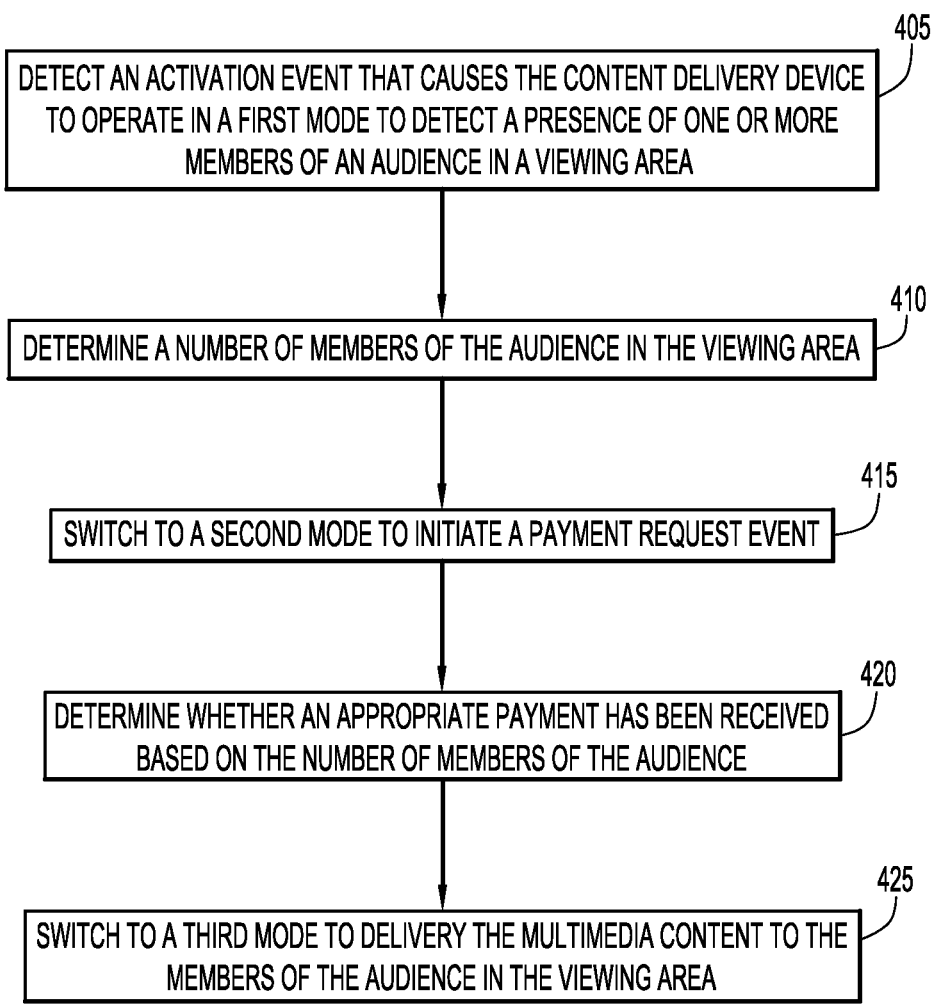
FIG. 4 shows an example flow chart of the content delivery device operating in a plurality of modes to detect a presence of audience members, initiate a payment request event and to deliver multimedia content to audience members when appropriate.

Reference is now made to FIG. 4. FIG. 4 shows an example flow chart 400 that shows processes for the content delivery device 104 to operate in a plurality of modes. It should be appreciated that the content delivery device 104 may operate in each of the modes independently from one another or may operate in the modes concurrently. At operation 405, the content delivery device 104 detects an activation event that causes the content delivery device 104 to operate in the first mode. The first mode enables the content delivery device 104 to detect a presence of one or more of the audience members 106(1)-106(n) in a viewing area. For example, in the first mode, the content delivery device 104 may use pattern recognition software stored in memory 306 to enable the sensor 110 to scan the viewing area and to enable the content delivery device 104 to recognize the audience members 106(1)-106(n) based on the scanning. As stated above, the content delivery device 104 is configured to detect the audience members 106(1)-106(n) by differentiating human audience members from the objects 108(1)-108(4), described in connection with FIG. 1 above. In one embodiment, the content delivery device 104 is also configured to differentiate between adult audience members and children audience members. This differentiation may be important since access to multimedia content may have lower fees and/or may be restricted for children audience members in comparison to higher fees and larger selections of content for adult audience members.

At operation 410, the content delivery device 104 is configured to determine a number of members of the audience in the viewing area, and at operation 415, the content delivery device 104 switches to a second mode to initiate a payment request event. The payment request event requests payment for the multimedia content based on the number of members in the audience. The payment request event, for example, may prompt a user (who may be one of the audience members 106(1)-106(n)) to pay a per-person fee before accessing a requested movie. The fee may be received by the content delivery device 104 via traditional e-commerce mechanisms. In one example, a user may submit a payment via an electronic transfer or credit card entry.

At operation 420, the content delivery device 104 determines whether an appropriate payment has been received based on the number of audience members detected. When the appropriate payment has been received, at operation 425, the content delivery device 104 switches to a third mode to deliver the multimedia content to the members of the audience in the viewing area. For example, as stated above, the multimedia content may be encrypted (e.g., encrypted at 128 bits, 192 bits or 256 bits) and may be decrypted by the content delivery device 104 before being delivered to the members of the audience in the viewing area via the display unit 102. The encryption eliminates the threat of copying the movie using software installed onto the electronic devices that connect to the content delivery device 104. In one example, the content delivery device 104 may obtain the multimedia content using the Digital Living Network Alliance® (DLNA) standards, Digital Transmission Content Protection (DTCP) Internet Protocol (IP) standards and/or Transfer Control Protocol (TCP) IP standards. For example, the DTCP-IP standard is a digital rights management (DRM) standard that aims to restrict "digital home" technologies including DVD players and televisions by encrypting interconnections between devices. The DLNA standard applies a layer of restrictions over various types of media file formats, encodings and resolutions.

The audience members can control the playback of the multimedia content (e.g., play, pause, fast-forward, rewind, etc.) via, e.g., the keyboard 218. Additionally, in one example, a predetermined time window (e.g., three minutes) may be selected by the content delivery device 104 after switching to the third mode. During the predetermined time window, the content delivery device 104 can determine whether one or more members has withdrawn from the audience in the viewing area and can provide a refund for payment for the one or more members that has withdrawn from the audience in the viewing area. Additionally, during the predetermined time window, one or more of the audience members 106(1)-106(n) may change a selection of the multimedia content by, for example, inputting a change request via the keyboard 218 of the content delivery device 104. The change in the selection may be made without the content delivery device 104 initiating another payment request event. In one example, members can view a movie trailer for free. If they choose to watch the full movie, they may purchase a ticket. In one example, the members may not be able to cancel the movie order once it is placed. In another example, one or more members of the audience can send an instruction to the content delivery device 104 (e.g., by motioning, pressing a button on the content delivery device 104 and/or sending an input to the content delivery device 104) to pause the delivery of the multimedia content (e.g., indefinitely). Upon receiving the instruction, the content delivery device 104 can pause the delivery of the multimedia content and can resume the delivery of the multimedia content upon receiving another instruction from one or more members of the audience to resume the multimedia content. Upon resuming the multimedia content, the content delivery device 104 can reevaluate the viewing area to determine whether or not an appropriate number of audience members is present. For example, the content delivery device 104 can sense the number of people in the viewing area and, if the number is greater than the number of paid attendees before the pause, the system would request additional payment before resuming.

As stated above, the various modes of operation of the content delivery device 104 may occur independently or may occur concurrently. In one example, the content delivery device 104 may operate in the second mode (i.e., to request payment) before operating in the first mode to determine the number of audience members. In another example, the content delivery device 104 may periodically operate the content delivery device 104 in the first mode concurrently with the third mode while the content is being delivered to members of the audience. A determination can then be made as to whether a change in the number of members of the audience in the viewing area has occurred and if so, the content delivery device 104 can determine whether additional payment is required (e.g., if a new number of audience members is in the viewing area). If an additional payment is required, the content delivery device 104 may pause the delivery of the multimedia content temporarily and may switch to the second mode until the additional payment is received. In one example, when the content delivery device 104 pauses the delivery of the multimedia content, the screen on the display 102 will be shaded and a message will appear that asks audience members to correct the error (e.g., by purchasing extra tickets for the additional audience members or by asking the additional audience members to leave the viewing area). Upon appropriate payment or adjustment of the number of audience members, the content delivery device 104 may switch back to the third mode upon confirmation that the additional payment has been received.

Figure 5A:
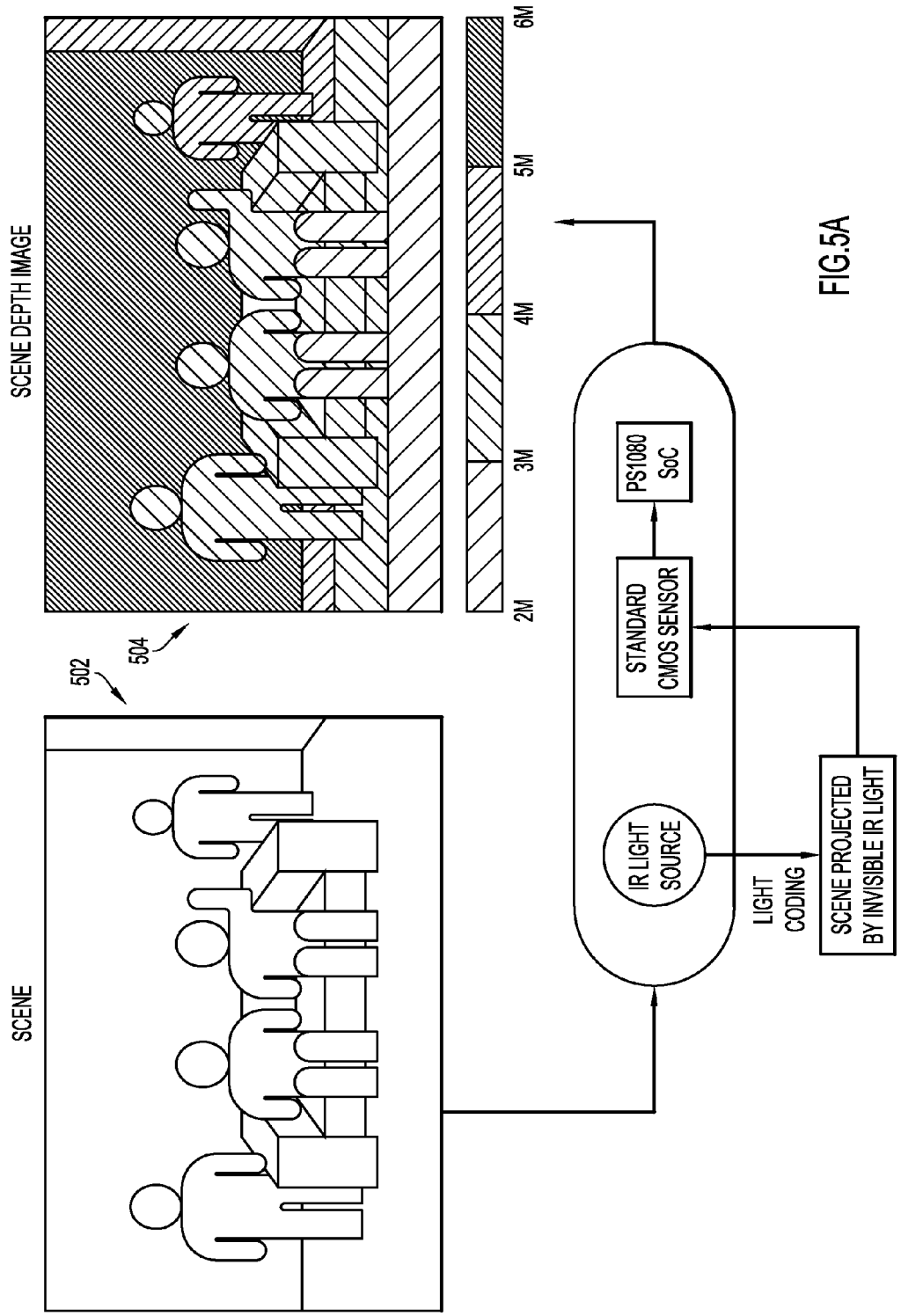
FIGS. 5A and 5B show example images recorded by a sensor of the content delivery device.
Figure 5B:
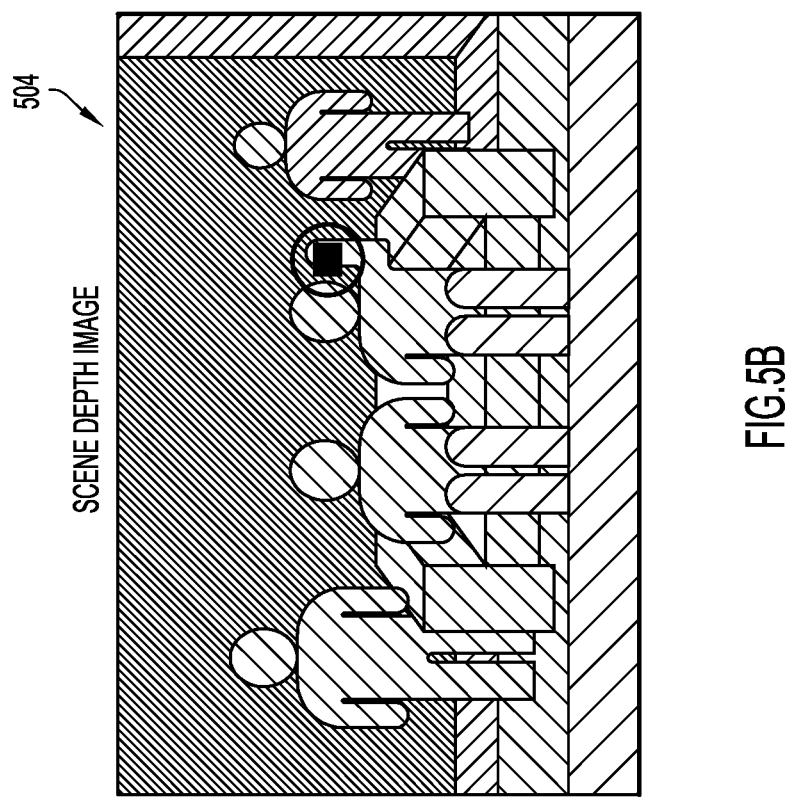

Reference is now made to FIGS. 5A and 5B, which show example images recorded by the sensor 110 of the content delivery device 104. In FIG. 5A, the sensor 110 scan the scene or viewing area 502 and captures the depth image 504. The depth image 504 is shown in greater detail in FIG. 5B. As shown in FIG. 5B, the sensor 110 may generate a three dimensional (moving) image of the objects in its field of view and may recognize people among the objects. It should be appreciated, however, that though the sensor 110 may recognize and differentiate the people among the objects, privacy settings may be enabled in the sensor 110 (and the content delivery device 104, in general) that prevents the sensor 110 from capturing or recording facial features or any other features that may identify the audience members 106(1)-106(n). In one example, the sensor 110 may "blur-out" or otherwise distort the three dimensional image such that the facial features or other identifying features of the audience members 106(1)-106(n) are unrecognizable.

Additionally, the sensor 110 may transmit near-infrared light and may measure its "time of flight" after the light reflects from the objects and people. Time of flight operates similarly to a SONAR technology, where distance between objects can be measured based on the time duration of the light reflection measurement. The sensor 110 may additionally encode information in the near-infrared light such that as the light is reflected, it is deformed, which helps generate a finer image of the objects three dimensional texture.

By using only the near-infrared light measurement characteristic, the sensor 110 maps the room clearly showing that bodies and furniture are differentiated. The sensor 110 (and sensors of the sensor 110) uses patter recognition software to check various pre-identified parameters to recognize external recording devices that do not transmit infrared radio signals.

Thus, the system as described herein enables home-viewing of multimedia content. The multimedia content may be retrieved by the content delivery device 104 and may be delivered to a viewing area (e.g., a living room) upon proper payment by audience members for the content. The content delivery device 104 can detect the presence of the audience members in the viewing area, can differentiate between audience members and other objects and can count the number of audience members present in the viewing area.

In general, a user can activate the system by plugging in the content delivery device (e.g., via a USB cable) to any electronic device configured with high-speed internet access). The user then downloads and installs software onto the electronic device to activate the content delivery device 104. The software prompts the user to enter login credentials (via a user interface on the electronic device) or to create a new account. Upon logging in or creating a new account, the user can request access to a multitude of movies and other multimedia content stored in a database accessible by the electronic device and the content delivery device 104. Upon making a selection, the user may be prompted to enter an appropriate fee (e.g., via an electronic financial transaction) based on the number of audience members, and upon receipt of the fee, the movie can be delivered to the audience members 106(1)-106(n) in the viewing area. Thus, the system may operate as an on-demand virtual cinema, adding new movies every week just like the regular theaters. In one example, the user may pick a movie to watch and launching the movie may automatically activate the content delivery device 104 to perform the audience detection techniques and the multimedia content delivery techniques as described herein. The system described herein may also provide full parental controls to limit access to multimedia content that may be inappropriate or undesirable for viewing by children audience members.

It should be appreciated that the techniques described above in connection with all embodiments may be performed by one or more computer readable storage media that is encoded with software comprising computer executable instructions to perform the methods and steps described herein. For example, the operations performed by the content delivery device 104 may be performed by one or more computer or machine readable storage media (non-transitory) or device executed by a processor and comprising software, hardware or a combination of software and hardware to perform the techniques described herein.

In summary, a method is provided for delivering multimedia content in a viewing area. The method comprises: scanning the viewing area; detecting a presence of one or more members of an audience; determining the number of members of the audience; and delivering the multimedia content to the members of the audience when an appropriate payment has been received for the number of members of the audience.

Additionally, a method for delivering multimedia content to members of an audience is provided. The method comprises: at a content delivery device, detecting an activation event that causes the content delivery device to operate in a first mode to detect a presence of one or more of the members of the audience in a viewing area; determining a number of members of the audience in the viewing area; switching to a second mode to initiate a payment request event, wherein the payment request event requests payment for the multimedia content based on the number of members of the audience; determining whether an appropriate payment has been received based on the number of members of the audience; and when the appropriate payment has been received, switching to a third mode to deliver the multimedia content to the members of the audience in the viewing area.

Furthermore, an apparatus is provided for delivering multimedia content. The apparatus comprises: a plurality of ports; a memory; and a processor coupled to the ports and the memory and further configured to: detect an activation event that causes the content delivery device to operate in a first mode to detect a presence of one or more of the members of the audience in a viewing area; determine a number of members of the audience in the viewing area; switch to a second mode to initiate a payment request event, wherein the payment request event requests payment for the multimedia content based on the number of members of the audience; determine whether an appropriate payment has been received based on the number of members of the audience; and switch to a third mode to deliver the multimedia content to the members of the audience in the viewing area when the appropriate payment has been received.

The above description is intended by way of example only. Various modifications and structural changes may be made therein without departing from the scope of the concepts described herein and within the scope and range of equivalents of the claims.

What is claimed is:

1. A method for delivering multimedia content to members of an audience, the method comprising:
    at a content delivery device, detecting an activation event that causes the content delivery device to operate in a first mode to detect a presence of one or more of the members of the audience in a viewing area;
    determining, by the content delivery device, a number of members of the audience in the viewing area;
    switching, by the content delivery device, to a second mode to initiate a payment request event, wherein the payment request event requests payment for the multimedia content based on the number of members of the audience;
    determining, by the content delivery device, whether an appropriate payment has been received based on the number of members of the audience;
    when the appropriate payment has been received, switching, by the content delivery device, to a third mode to deliver the multimedia content to the members of the audience in the viewing area;
    periodically operating the content delivery device in the first mode concurrently with the third mode while the content is being delivered to the members of the audience;
    determining, by the content delivery device, whether a change in the number of members of the audience in the viewing area has occurred;
    when the change in the number of members of the audience in the viewing area has occurred, determining, by the content delivery device, whether additional payment is required based a new number of members of the audience in the viewing area; and
    when additional payment is required, switching, by the content delivery device, the content delivery device to the second mode and pausing delivery of the multimedia content to the members of the audience until the additional payment is received.

2. The method of claim 1, further comprising resuming delivery of the multimedia content to the members of the audience upon confirmation that the additional payment has been received.

3. The method of claim 1, wherein periodically operating the content delivery device in the first mode concurrently with the third mode comprises operating the content delivery device in the first mode concurrently with the third mode at time intervals throughout delivery of the multimedia content to ensure that appropriate payment for the number of members of the audience at the time intervals has been received.

4. The method of claim 1, further comprising:
    selecting, by the content delivery device, a predetermined time window after switching to the third mode to deliver the multimedia content;
    wherein determining whether a change in the number of members of the audience in the viewing area has occurred includes detecting whether one or more members has withdrawn from the audience in the viewing area during the predetermined time window; and
    providing, by the content delivery device, a refund for payment for the one or more members that has withdrawn from the audience in the viewing area.

5. The method of claim 4, wherein selecting a predetermined time window comprises selecting the predetermined time window such that one or more members of the audience can, during the predetermined time window, change a selection of the multimedia content to be delivered without initiating another payment request event.

6. The method of claim 1, wherein the payment request event occurs before determining the number of members of the audience.

7. The method of claim 1, wherein determining the number of members of the audience comprises determining the number of members of the audience in the viewing area by performing a 360 degree scan of the viewing area.

8. The method of claim 1, wherein determining the number of members of the audience comprises determining the number of members of the audience by differentiating the members of the audience from other objects in the viewing area.

9. The method of claim 8, wherein differentiating the members of the audience from the other objects comprises differentiating the members of the audience from the other objects by using pattern recognition techniques to recognize audience members.

10. An apparatus for delivering multimedia content comprising:
    a plurality of ports;
    a memory; and
    a processor coupled to the ports and the memory and further operable to:
    detect an activation event that causes the content delivery device to operate in a first mode to detect a presence of one or more of the members of the audience in a viewing area;
    determine a number of members of the audience in the viewing area;
    switch to a second mode to initiate a payment request event, wherein the payment request event requests payment for the multimedia content based on the number of members of the audience;
    determine whether an appropriate payment has been received based on the number of members of the audience;
    switch to a third mode to deliver the multimedia content to the members of the audience in the viewing area when the appropriate payment has been received;
    periodically operate the content delivery device in the first mode concurrently with the third mode while the content is being delivered to the members of the audience;
    determine whether a change in the number of members of the audience in the viewing area has occurred;
    determine whether additional payment is required based a new number of members of the audience in the viewing area when the change in the number of members of the audience in the viewing area has occurred; and
    switch the content delivery device to the second mode and pausing delivery of the multimedia content to the members of the audience until the additional payment is received when additional payment is required.

11. The apparatus of claim 10, wherein the processor is further operable to resume delivery of the multimedia content to the members of the audience upon confirmation that the additional payment has been received.

12. The apparatus of claim 10, wherein the processor is further operable to periodically the content delivery device in the first mode concurrently with the third mode at time intervals throughout delivery of the multimedia content to ensure that appropriate payment for the number of members of the audience at the time intervals has been received.

13. The apparatus of claim 10 wherein the processor is operable to determine a number of members of the audience by performing a 360 degree scan of the viewing area.

14. The apparatus of claim 10 wherein the processor is operable to determine a number of members of the audience by differentiating the members of the audience from other objects in the viewing area.

15. The apparatus of claim 14 wherein the processor is operable to differentiate the members of the audience from other objects in the viewing area by using pattern recognition techniques to recognize audience members.

\* \* \* \* \*